US009645263B2

(12) United States Patent
Meier et al.

(10) Patent No.: US 9,645,263 B2
(45) Date of Patent: May 9, 2017

(54) METHOD FOR PROVIDING A WARNING OF RADIATION-DOSE-RELEVANT SPACE-WEATHER EVENTS AT CRUISING ALTITUDES

(71) Applicant: Deutsches Zentrum fur Luft-und Raumfahrt e.V., Cologne (DE)

(72) Inventors: Matthias Meier, Konigswinter (DE); Daniel Matthia, Cologne (DE)

(73) Assignee: Deutsches Zentrum für Luft-und Raumfahrt e.V., Koln (DE)

(*) Notice: Subject to any disclaimer, the term of this patent is extended or adjusted under 35 U.S.C. 154(b) by 193 days.

(21) Appl. No.: 14/532,206

(22) Filed: Nov. 4, 2014

(65) Prior Publication Data
US 2015/0123004 A1  May 7, 2015

(30) Foreign Application Priority Data
Nov. 4, 2013  (DE) .................. 10 2013 222 315

(51) Int. Cl.
*G01T 7/12* (2006.01)
*G01T 1/02* (2006.01)
(Continued)

(52) U.S. Cl.
CPC .................. *G01T 7/12* (2013.01); *G01T 1/02* (2013.01); *G01T 7/00* (2013.01); *G01W 1/00* (2013.01)

(58) Field of Classification Search
CPC ....................................................... G01T 7/12
See application file for complete search history.

(56) References Cited

U.S. PATENT DOCUMENTS 5,841,142 A * 11/1998 Duftschmid ............. G01V 5/02
250/336.1
7,223,979 B1 * 5/2007 Crain, Jr. ................ G01T 1/026
250/370.07
(Continued)

OTHER PUBLICATIONS

Search Report issued in corresponding European Application No. EP 2 869 088 A1 dated Mar. 4, 2015.
(Continued)

*Primary Examiner* — David Porta
*Assistant Examiner* — Jeremy S Valentiner
(74) *Attorney, Agent, or Firm* — Renner, Otto, Boisselle and Sklar, LLP

(57) ABSTRACT

The method for providing a warning of radiation-dose-relevant space-weather events at cruising altitudes comprises the steps of detecting radiation data of the atmospheric radiation, particularly ionizing radiation in the atmosphere, and providing a radiation model for 3D-spatially resolved estimation of a radiation field at cruising altitudes of the earth's atmosphere by use of a radiation dose rate scale based on a continuous range of values. Moreover, the 3D-spatially resolved rates of the effective radiation dose on the basis of the detected radiation data and the radiation model will be estimated. The radiation dose rate scale is divided, based on a continuous range of values, into a discrete, i.e. graduated radiation dose rate scale comprising individual successive ranges of values of increasing radiation dose rates, and respectively one index will be assigned to each range of values, wherein a first range of values is between a radiation dose rate of zero and a presettable first upper limit, a second range of values is between the first upper limit and a second upper limit which is equal to a presettable multiple of the first upper limit, and each further range of values is between the upper limit of the next smaller range of values and an upper limit which is equal to the
(Continued)

presettable multiple of the upper limit of the next smaller range of values. As a warning, there is indicated the index of that range of values within which is situated the estimated radiation dose rate for a presettable range in the earth's atmosphere.

7 Claims, 3 Drawing Sheets

(51) Int. Cl.
*G01T 7/00* (2006.01)
*G01W 1/00* (2006.01)

(56) References Cited

U.S. PATENT DOCUMENTS

| | | | |
|---|---|---|---|
| 2004/0149918 A1* | 8/2004 | Craig | G01J 1/00 250/370.01 |
| 2004/0211912 A1* | 10/2004 | Lightfoot | G01T 1/169 250/394 |
| 2005/0267685 A1* | 12/2005 | Intriligator | G01W 1/10 702/3 |
| 2007/0012879 A1* | 1/2007 | Testardi | G01T 1/161 250/361 R |
| 2012/0256762 A1* | 10/2012 | Greenberger | H04Q 9/00 340/870.03 |

OTHER PUBLICATIONS

Matthew P. Sattler: "Prediction of flight-level radiation hazards due to solar energetic protons", Air Force Institute of Technology, pp. 37 and 44-48, Jan. 2006.

P. Lantos et al.: "History of the solar particle event radiation doses on-board aeroplanes using a semi-empirical model and Concorde measurements", Radiation Protection Dosimetry, pp. 199-210, May 2003.

C. J. Mertens et al.: "NAIRAS aircraft radiation model development, dose climatology, and initial validation", Space Weather, pp. 603-635, Oct. 2013.

Jennifer Meehan et al.: "Workshop Addresses Aviation Community", Space Weather: The International Journal of Reasearch and Applications, Aug. 2012.

R. B. Horne et al.; "Space weather impacts on satellites and forecasting the Earth's electron radiation belts with Spacecast"; Space Weather, vol. 11, pp. 169-186, American Geophysical Union, 2013.

A. Glocer et al.; "Integration of the radiation belt environment model into the space weather modeling framework"; Journal of Atmospheric and Solar-Terrestrial Physics, pp. 1653-1663, Elsevier Ltd., 2009.

* cited by examiner

METHOD FOR PROVIDING A WARNING OF RADIATION-DOSE-RELEVANT SPACE-WEATHER EVENTS AT CRUISING ALTITUDES

RELATED CROSS-REFERENCING

The present invention claims the priority of German Patent Application 10 2013 222 315.3 filed on Nov. 4, 2013, the disclosure of which is incorporated herein by reference.

BACKGROUND OF THE INVENTION

Field of the Invention

The invention relates to a method for providing a warning of radiation-dose-relevant space-weather events at cruising altitudes.

Description of the Relevant State of the Art

Due to the galactic cosmic radiation, exposure to radiation at the cruising altitudes of civil aviation (FL280-FL410) is increased by a factor of about 100 as compared to terrestrial exposures. The radiation field is heavily dependent on the local shielding effect of the terrestrial magnetic field, e.g. parameterized by the geometric latitude. This radiation field is further influenced by the variation of the interplanetary magnetic field due to the solar cycle. These different independent influences lead to a radiation field at cruising altitudes that is very complex in its composition and energy distribution.

Within the solar cycle, there exist, apart from the galactic cosmic radiation, also temporary radiation contributions by the solar cosmic radiation when, as a result of radiation bursts on the sun, i.e. so-called SPEs (abbreviation for solar particle events), particles are generated which are sufficiently energy-rich to penetrate the upper layers of the atmosphere. Due to secondary interaction of the primary radiation component with components of the atmosphere, such events also entail a distinct increase of corresponding count rates of ground-based instruments for measuring the intensity of cosmic radiation, i.e. so-called GLEs (ground level events and resp. ground level enhancements), and within the solar cycle they will occur with increased likelihood in the fading solar maximum.

The occurrence of radiation bursts on the sun that may lead to an additional radiation exposure at cruising altitudes, cannot be reliably predicted with the aid of the present state of the art, and such a prediction may even be principally impossible. The reason for this is, inter alia, that only the high-energy component (>500 MeV/n) of the particles emitted in such a solar radiation burst can enter the atmosphere deeply enough.

Presently, the Space Weather Prediction Center (SWPC) of the US National Oceanic and Atmospheric Administration (NOAA) will inform the public on the respective current space-weather situation and, via its homepage or an information service through email, will issue corresponding warnings (http://www.swpc.noaa.gov/). These warnings are based, as a physical evaluation quantity, on the flux of energy-rich particles at the position of the GOES-13 satellite (Geostationary Operational Environmental Satellite) of the NOAA. The classification of these warnings is performed by a scale (S-scale) whose index is given by the exponent of the flux of particles with energies above 10 MeV to the base 10. This classification is an evaluation of the radiation environment in near-earth orbits but is also extended to evaluations in the field of aviation. In the latter case, however, in consideration of the respective spectral index of the energy distribution of the incident particles, the major portion of the flux will normally be significantly below an energy threshold for dose-relevant contributions at cruising altitudes. In so far, in this scenario, false alarms are triggered which, in some airline companies, will result in unnecessary and cost-intensive measures.

In the absence of predictability of dose-relevant solar radiation contribution in aviation, such events can be detected only after the resultant increase of radiation intensity. Basically, this is possible by direct or indirect methods. On the one hand, the dose rate associated with the radiation exposure at cruising altitudes, i.e. both the energy dose rate dD/dt and the environment equivalent dose rate dH*(10)/dt can be measured directly in an aircraft with the aid of suitable dose meters. On the other hand, dose-relevant SPEs can also be monitored by a clear response of ground-based measurement instruments (e.g. neutron monitors). Also from a combination of the measurement data of various instruments, it is possible to estimate the corresponding data rates with the aid of radiation models, i.e. as is the case in direct measurement.

As already mentioned above, the Space Weather Prediction Center of the NOAA will inform the public situations of a space-weather event with increased proton influences which are measured at the position of the GOES-13 satellite. Classification of corresponding warnings will be performed by the S-scale whose index is given by the exponent of the flux of particles with energies above 10 MeV to the base 10. Since, however, due to the energy distribution in connection with the atmospheric shielding, the major part of the flux of incident parts normally will be significantly below an energy threshold for dose-relevant contributions at cruising altitudes, largely false alarms will be triggered in this scenario which, in some airline companies, will then entail unnecessary and cost-intensive measures. This has already had the consequence that these isolated warnings from the NOAA, based on unsuited physical parameters, have been generally ignored by some airline companies. Further, the S-scale used for classification of the space-weather events, will deliver only a global warning parameter and does not include a differentiation with respect to the really planned and respectively traveled route, e.g. under consideration of the corresponding local geomagnetic shielding.

Still, it has to be assumed that, irrespective of the above, most airline companies are interested in—or in need of—reliable, timely warnings of dose-relevant space-weather events.

It is an object of the invention to provide a method which is adapted to timely detect an additional, dose-relevant radiation component through a solar-particle event occurring at cruising altitudes and, with the aid of a model correspondingly adapted to the characteristics of the radiation burst, to make available, to users and the public, information on the radiation exposure at cruising altitudes both as a global and a regional warning. Thereby, e.g. airline companies will in case of a given event have the opportunity, by operational action, to carry out suitable radiation protection measures and effect a reduction of the dose according to §94 of the German Radiation Protection Ordinance (StrlSchV) under consideration of operational parameters.

SUMMARY OF THE INVENTION

To achieve the above object, the invention proposes a method for providing a warning of radiation-dose-relevant space-weather events at cruising altitudes, said method comprising the following steps:
  detecting radiation data of the atmospheric radiation, particularly ionizing radiation in the atmosphere, said detection being performed particularly by preferably up-to-date measurement data,
  providing a radiation model for 3D-spatially resolved estimation of a radiation field at cruising altitudes of the earth's atmosphere by use of a radiation dose rate scale based on a continuous range of values,
  estimation of the 3D-spatially resolved rates of the effective radiation dose on the basis of the detected radiation data and the radiation model,
  dividing said radiation dose rate scale based on a continuous range of values into a discrete, i.e. graduated radiation dose rate scale comprising individual successive ranges of values of increasing radiation dose rates, and assigning respectively one index to each range of values, wherein a first range of values is between a radiation dose rate of zero and a presettable first upper limit, a second range of values is between the first upper limit and a second upper limit which is equal to a presettable multiple of the first upper limit, and each further range of values is between the upper limit of the next smaller range of values and an upper limit which is equal to the presettable multiple of the upper limit of the next smaller range of values, and
  as a warning, there is indicated the index of that range of values within which is situated the estimated radiation dose rate for a presettable range in the earth's atmosphere.

The invention is based on the combination of a particularly quasi-real-time-capable model (radiation transport model or other radiation models as described e.g. in Daniel Matthiä: The radiation environment in the lower atmosphere—A numerical approach, Dissertation, 2009; I. Clairand et al, THE SIEVERT SYSTEM FOR AIRCREW DOSIMETRY, Radiation Protection Dosimetry (2009, Vol. 136, No. 4, pp. 282-285; D. Matthiä et al, Temporal and spatial evolution of the solar energetic particle event on 20 Jan. 2005 and resulting radiation doses in aviation, Journal of Geophysical Research, Vol. 114, A08104, doi:10.1029/2009JA014125, 2009) for construction of the energy spectrum of the incident solar particles on the basis of current measurement data from different sources, an atmospheric radiation model and a dose-rate-based scale whose index is particularly suited as an exponent to the base of 2 for provision of local and derived global warnings of dose-relevant space-weather events at cruising altitudes.

Of particular use as data sources are e.g. satellite-based measurement instruments and neutron monitors of different geographic positions. The dose rate estimation on a grid model of the earth's atmosphere, detected by use of the model on the basis of the measurement data, allows for a quasi-realtime provision of the index-based warnings as a reliable platform for the realization of correspondingly defined options for operational action on the side of airlines.

According to an advantageous embodiment of the invention, it is provided that, as said multiple value, the number 2 or 3 is selected.

According to a further advantageous embodiment of the invention, it is provided that, for detection of the radiation data, satellite-, air- and/or ground-based measurement instruments are made available for use.

According to an advantageous embodiment of the invention, it can be provided that the radiation model is a dynamic model which includes quantitative information with respect to the radiation intensity and its change over time.

According to a further advantageous embodiment of the invention, it is provided that, with the aid of the radiation model, conclusions are drawn from the radiation data on an energy spectrum of the particles of a radiation-dose-relevant event.

According to a further advantageous embodiment of the invention, the method can be applied to the effect that the index for the respective range within the earth's atmosphere is used as a local warning index and/or that the maximum index of the indices is used as a global warning index for a plurality of regions of the earth's atmosphere, particularly for all regions of the earth's atmosphere.

BRIEF DESCRIPTION OF THE DRAWINGS

A full and enabling disclosure of the present invention, including the best mode thereof, enabling one of ordinary skill in the art to carry out the invention, is set forth in greater detail in the following description, including reference to the accompanying drawing in which.

DETAILED DESCRIPTION OF PREFERRED EMBODIMENTS

The reliable detection of a global and regional warning situation in dose-relevant space-weather events requires a spatially resolved estimation of the entire radiation field at cruising altitudes in the earth's atmosphere with indication of the corresponding rate of the effective dose (dE/dt in μSv/h). Beyond this, the method also allows for consideration of the corresponding dose rate by the galactic cosmic radiation, whereby the additional component $\dot{E}_{sol}$ can even be detected in an isolated manner by solar contributions. Herein, a scale for corresponding warnings which is suited both for protection from radiation and for determining options for action can be constructed on the basis of a transgression of predetermined thresholds of $\dot{E}_{sol}$:

$$\dot{E}_{sol} = 2.5 \frac{\mu Sv}{h} \cdot 2^D$$

The corresponding index D (dose rate) for dose rates above 5 μSv/h will then be given by the respective exponent to the base of 2. Values below 5 μSv/h will be classified by definition with the index 0:

| Index D | Dose rate μSv/h |
|---|---|
| 0 | <5 |
| 1 | 5 |
| 2 | 10 |
| 3 | 20 |
| 4 | 40 |
| 5 | 80 |
| 6 | 160 |
| 7 | 320 |
| 8 | 640 |

By use of the dose-rate-based index D, it is possible, for each point on a spatially resolved grid network of the earth, to describe a local warning situation under consideration of the flight altitude. In case of a generalized local warning, a barometric flight altitude of 41000 feet (FL410) is assumed as a worst-case scenario.

The global warning level derived therefrom will then correspond to the maximum of the generalized local warnings.

The basis for the estimation of the radiation field at cruising altitudes during a solar radiation burst is formed by a model for the construction of the respective primary flux and energy spectrum by timely evaluation of neutron monitor data of different geographic positions and of satellite data, as well as by an estimation of the temporal development of the event. This energy spectrum of incident solar particles will then be used as an input parameter for an atmospheric radiation model which allows for the estimation of dose rates on a grid model of the earth's atmosphere.

The advantage over the state of the art is evident. Airline companies will be able to plan operational measures for radiation protection of passengers and staff members and to react adequately in dependence on the respective space-weather situation. Thus, for instance, in case of events on large geomagnetic latitudes and on high flight altitudes, there may occur significant increases of the dose rate wherein a change of the flight altitude will lead to a decrease of the dose, while, on the other hand, in case of small geomagnetic latitudes or on low flight altitudes, no increased exposure will occur and a change of the flight route will have no dose-reducing effect.

Figure 1:
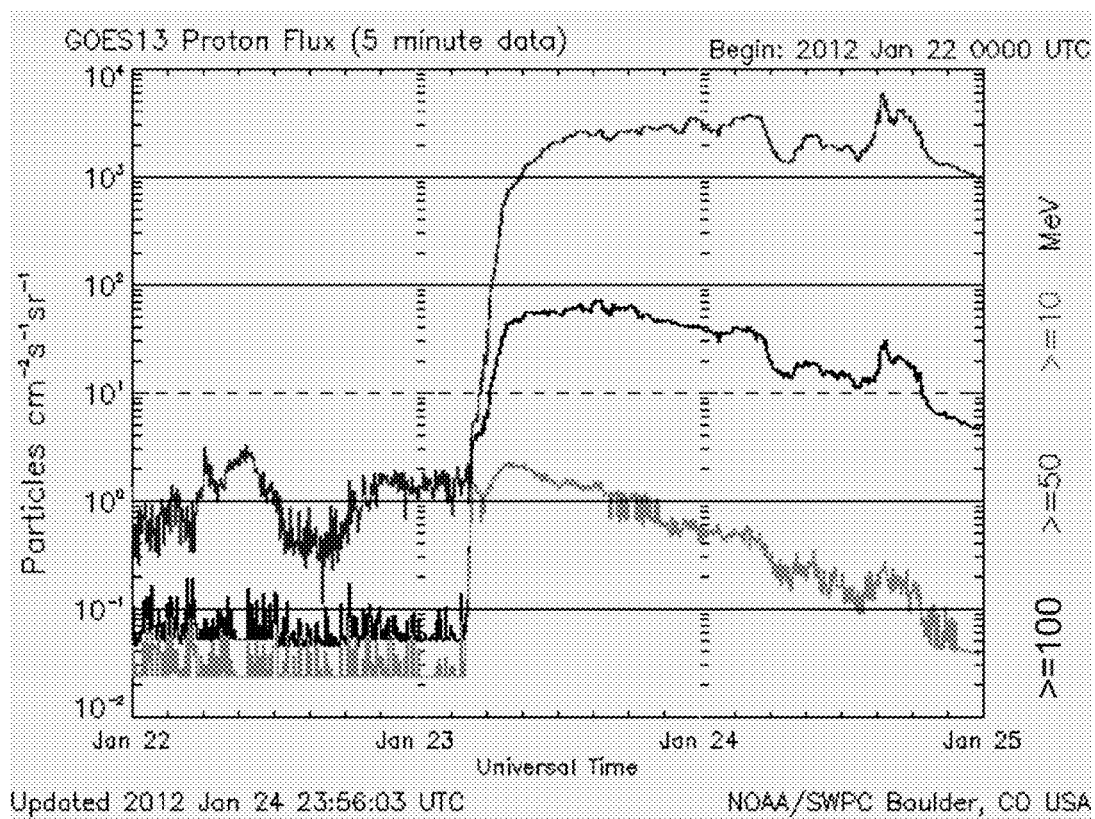
FIG. 1 is a diagram of the temporally resolved particle flux at the position of the GOES-13 satellite between Jan. 22 and 25, 2012, wherein the lowermost curve represents the particle flux of the protons having an energy of more than 100 MeV, the intermediate curve represents the particle flux of the protons having an energy of more than 50 MeV, and the uppermost curve represents the particle flux of the protons having an energy of more than 10 MeV.

On Jan. 23, 2012, a solar radiation burst occurred which on the corresponding NOAA S-scale was ranked, for about 36 hours, as a so-called S3 warning (FIG. 1). In some airline companies, this lead to measures, e.g. a fuel-intensive reduction of the flight altitude, change of the flight route, which caused considerable costs. Further, it had to be observed that the involved airline staff members became or were correspondingly disquieted. A timely evaluation on the basis of the method of the invention would have led to the recognition that these measures had not been necessary since the dose-rate-based index D for this event would have been 0.

Figure 2:
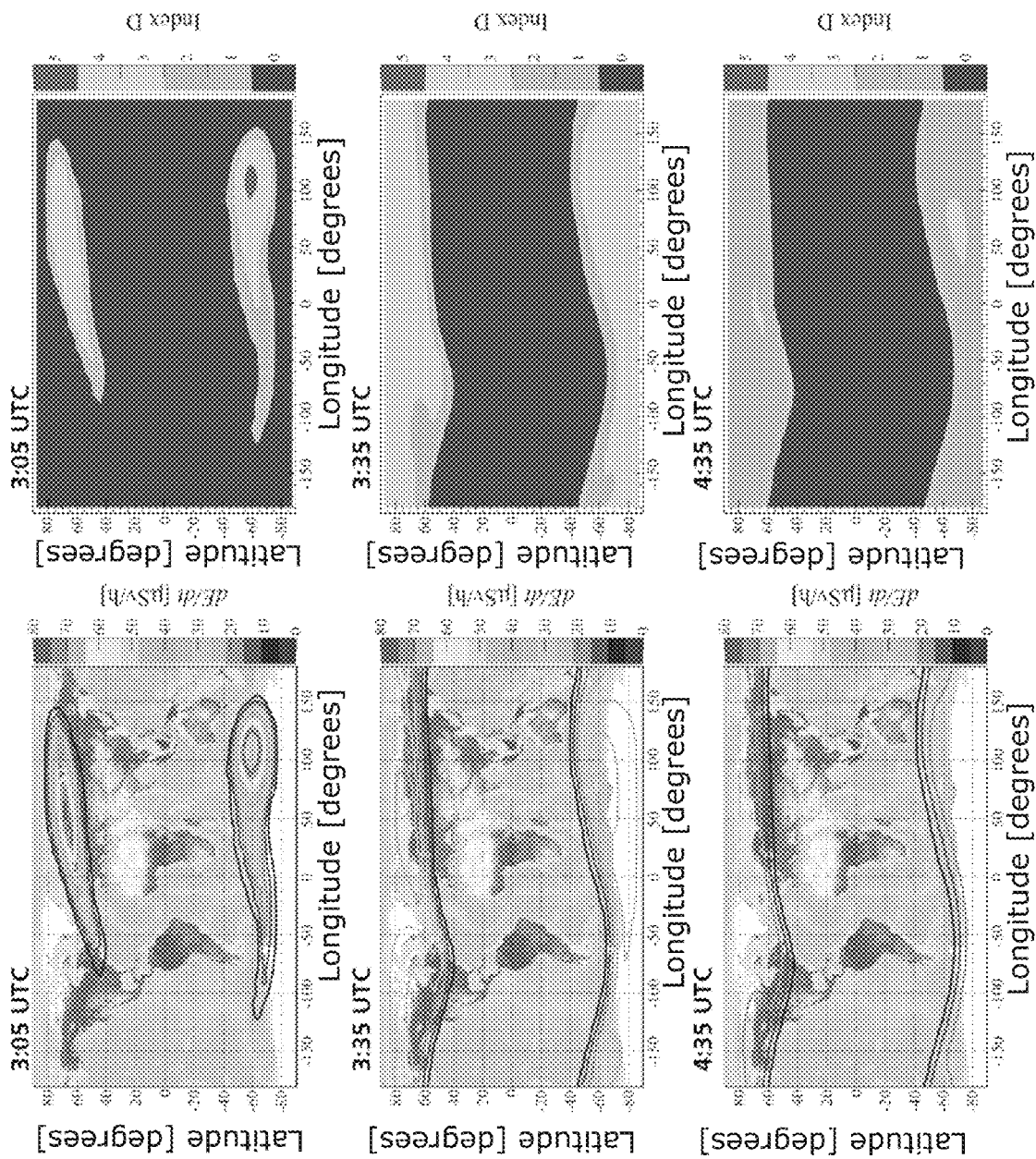
FIG. 2 shows diagrams of the computed rates of the effective dose dE/dt (left-hand side) and the corresponding indices according to the invention (right-hand side) at different points of time during the GLE70 on Dec. 13, 2006: briefly after the beginning of the event (3:05 UTC) and half an hour (3:35 UTC) and respectively one and a half hours (4:35 UTC) after the beginning of the event (copyright of world map: NASA)
Figure 3:
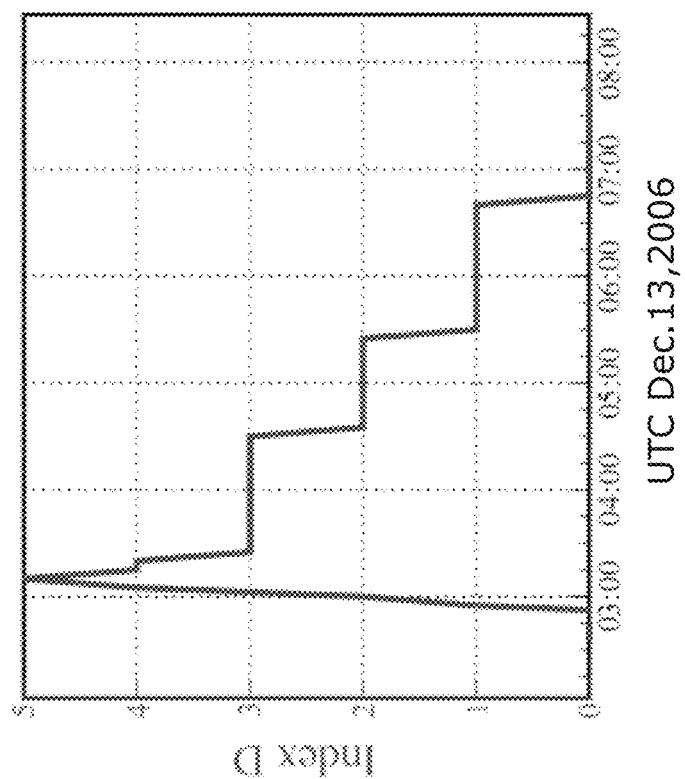
FIG. 3 shows diagrams of the rates of the effective dose dE/dt (left-hand side) and the corresponding index D according to the invention (right-hand side) during the GLE70 on Dec. 13, 2006, computed for the position of the maximum of the exposure to the radiation in the northern hemisphere (70° N, 50° E) on FL410.
Figure 3:
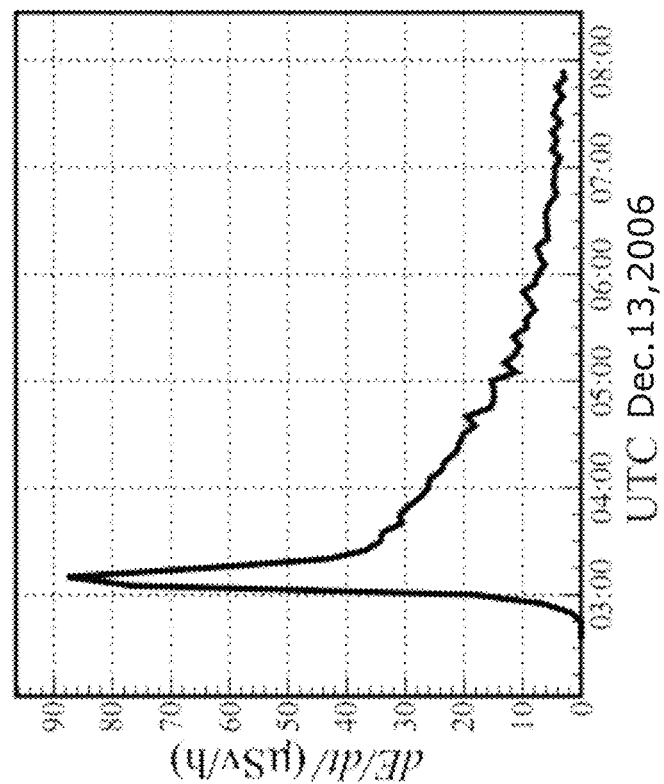

On Dec. 13, 2006, the GLE70 occurred which due to the integral proton fluxes measured by GOES came to result in a S2 warning. Other than said higher-ranked S3 event in January 2012, the GLE70 was associated with a significant number of high-energy particles whose interactions in the atmosphere were evidenced also on the ground. In contrast to the event in January 2012, the GLE70 was indeed relevant for the radiation exposure at cruising altitudes. FIG. 2 shows the computed rates of the effective dose on FL410 at three points of time, briefly after the event (3:05 UTC) and one and respectively one and a half hours after the event (left-hand side in FIG. 2). Shown on the right-hand side of FIG. 2 is the world-wide relevance of the event, as quantified by the above described index D, with respect to the radiation exposure in aviation. It can be clearly recognized that the radiation exposure—and thus the relevance of the event—shows both a temporal and a spatial dependence. For instance, at no time at all there was to be expected an increase of the radiation exposure in the latitude range between 40° S and 40° N. Further, particularly at the beginning of the event when the highest dose rates occurred, the increase of the radiation exposure was limited substantially to the eastern hemisphere. Thus, with the aid of the index shown in FIG. 2, an optimum adaptation of involved flight routes is possible during the event, and unnecessary aggravation to aviation traffic can be avoided. This is also true particularly if, in addition to the herein described worst-case considerations for FL410, low flight altitudes are also included in the analysis. FIG. 3 shows the development of the rate of the effective dose (left-hand side, FIG. 3) on FL410 with the coordinates (70° N, 50° E) where the maximum of the dose rate on the northern hemisphere was computed at the beginning of the event (3:05 UTC), and the corresponding index D (right-hand side, FIG. 3) through the course of the event. It is evident that briefly after the beginning of the event, there was to be expected a short-time dose rate which corresponded to an index D=5.

The invention is primarily intended for implementation in the operational processes of airline companies. The operational processes improved by the described method would lead to an adequate consideration of dose-relevant solar radiation bursts and would thus offer a reasonable basis for the fulfillment of §94 of the German Radiation Protection Ordinance (StrlSchV). Application of this method could optionally even be put on a legal basis.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A method for providing a warning of radiation-dose-relevant space-weather events at cruising altitudes, said method comprising the following steps:
acquiring radiation data of ionizing radiation in earth's atmosphere via at least one of satellite-based, air-based and ground-based measurement instruments,
providing a radiation model for a 3D-spatially resolved estimation of a radiation field at cruising altitudes of the earth's atmosphere by use of a radiation dose rate scale that is based on a continuous range of values,
generating 3D-spatially resolved rates of an estimated radiation dose that is based upon a calculation of the acquired radiation data with the radiation model, wherein the estimated radiation dose that is calculated has an estimated radiation dose rate scale that is based on a continuous range of values,
dividing the estimated radiation dose rate scale, which is based on a continuous range of values, into a graduated estimated radiation dose rate scale, the graduated dose rate scale comprising discrete successive ranges of values of estimated radiation dose rates, wherein the discrete successive ranges of values continuously increase by a predetermined multiple, such that a first range of values is between an estimated radiation dose rate of zero and a presettable first upper limit, a second range of values is between the first upper limit and a second upper limit which is equal to the predetermined multiple of the first upper limit, and each further range of values is between the upper limit of the next smaller range of values and an upper limit which is equal to the predetermined multiple of the upper limit of the next smaller range of values, and wherein the predetermined multiple is a natural number that is greater than one, assigning respectively a different index value to each successive range of values of the graduated estimated radiation dose rate scale, wherein the different index values successively increase and are respectively assigned to correspond with the successively increasing ranges of values of the graduated dose rate scale, and mapping the assigned index values to a grid model of earth's atmosphere, and indicating the mapped index values on the grid model to provide a warning that indicates the index value associated with the range of values within which is situated the estimated radiation dose rate for a predefined region in the earth's atmosphere.

2. The method according to claim 1 wherein the number 2 or 3 is selected as the natural number.

3. The method according to claim 1 wherein the radiation model is a dynamic model which includes quantitative information with respect to radiation intensity and change of radiation intensity over time.

4. The method according to claim 1 wherein, with the aid of the radiation model, conclusions are drawn from the radiation data on an energy spectrum of particles of a radiation-dose-relevant event.

5. The method according to claim 1 wherein the detection of the radiation data is performed on the basis of current measurement data.

6. The method according to claim 1 wherein the index for the respective range of values is used as a local warning index.

7. The method according to claim 1 wherein the indices provide a maximum index and the maximum index is used as a global warning index for a plurality of regions of the earth's atmosphere or for all regions of the earth's atmosphere.

* * * * *